United States Patent Office 3,321,439
Patented May 23, 1967

3,321,439
PHOSPHORIC ACID DIARYL ESTERS AS CATALYSTS IN TRANSESTERIFICATION OF DIARYLCARBONATES WITH DIHYDRIC PHENOLS
Volker Bollert, Hamburg, Ulrich Curtius and Gerhard Fritz, Krefeld-Bockum, and Hermann Schnell, Krefeld-Urdingen, Germany, assignors to Farbenfabriken Bayer Aktiengesellschaft, Leverkusen, Germany, a German corporation
No Drawing. Filed July 27, 1964, Ser. No. 385,486
Claims priority, application Germany, Aug. 1, 1963, F 40,389
9 Claims. (Cl. 260—47)

This invention relates to polycarbonate plastics and more particularly to an improved method for the production of high molecular weight polycarbonates.

Polycarbonates can be produced by the transesterification of dialkyl, dicycloalkyl or diarylcarbonates for example, according to the process disclosed in the book by Christopher and Fox entitled, "Polycarbonates" at page 13. The polycarbonates melt at temperatures between about 100 and about 320° C. The reaction between the carbonate and the dihydroxy compound can be accelerated by transesterification catalysts including alkali and alkaline earth metals and their oxides, alcoholates and phenolates as well as salts of these metals with weak acids including sodium acetate, potassium carbonate, calcium propionate and the like.

The known transesterification catalysts include compounds of zinc, lead, cadmium, manganese, antimony, titanium and the like such as cadmium acetate, manganese carbonate, lead oxide, zinc borate and the like. These heretofore known transesterification catalysts often cause discoloration or cloudiness of the resulting polycarbonate product. The amount of catalyst to be used depends on the purity of the catalyst but usually varies between about 0.0001 and 0.1 percent by weight of the reaction mixture.

If strong basic catalysts are used, it is frequently necessary to neutralize the catalyst toward the end of the transesterification reaction or the thermal stability of the polycarbonates will be adversely effected.

It is, therefore, an object of this invention to provide an improved method of catalyzing the reaction leading to the production of polycarbonate plastics. Another object of this invention is to provide an improved transesterification catalyst. Still a further object of this invention is to provide an improved method of catalyzing the transesterification reaction in the production of a polyarylcarbonate. A further object of this invention is to provide polyarylcarbonates which have a better color property. Still another object of this invention is to provide for the catalysis of the later stages of the transesterification reaction leading to the production of polycarbonates. A further object of the invention is to provide combinations of catalysts which avoid discoloration or cloudiness when used in the production of polycarbonates.

The foregoing objects and others which will become apparent from the following description are accomplished in accordance with the invention, generally speaking, by providing phosphoric acid diaryl esters as catalysts for the production of polycarbonate plastics. Therefore, the present invention involves an improved method of catalyzing the production of polycarbonates via the transesterification route. In such a process wherein a diarylcarbonate is reacted with an aromatic dihydroxy compound, the reaction rate, especially in the final stages, is higher depending upon the kind of end groups which the polymers, already formed, possess. If, for example, an excess of the dihydroxy aromatic compound is present, then all of the chains will terminate with hydroxyl groups so that further polymer growth only takes place, via splitting off of this dihydroxy compound as illustrated below:

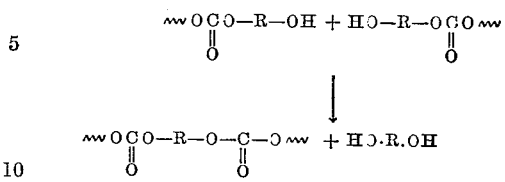

On the other hand, if an excess of the diarylcarbonate is present, then toward the end of the reaction all of the polymers will be terminated by carbonic acid ester groups and further chain growth takes place via splitting of the carbonic acid ester as illustrated below:

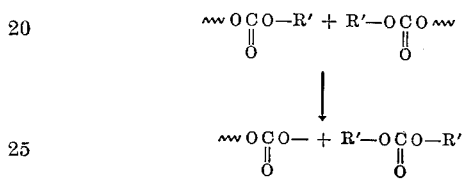

These reactions, i.e., both 1 and 2 above, proceed very slowly in comparison to the splitting of a monohydroxy compound which takes place in the presence of equivalent amounts of the starting materials according to the following equation:

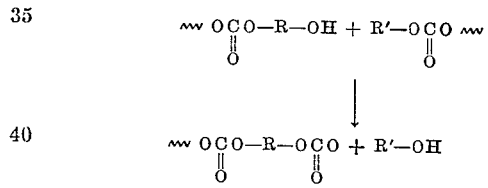

It is preferred, in accordance with the present invention, to divide the process into two steps. Initially, a diarylcarbonate and a dihydroxy aromatic compound are combined and reacted at about 100 to about 250° C. The initial reaction proceeds rapidly and the monohydroxy compound produced as a by-product is easily distilled out of the reaction mixture. Since the viscosity of the melt increases considerably as the polymer grows, the temperature is advantageously increased in the second step from about 250 to about 320° C. In the second step, a vacuum is applied and the transesterification is thereby completed and the last traces of the monohydroxy compound split off are removed. The second part of the process is very time consuming because the polymer growth becomes extremely slow due to a predominance of reaction of Types 1 and 2 set forth above.

The acceleration of the transesterification by the phosphoric acid diaryl esters is so effective that the delay caused by hydroxyalkylene or arylene or carbonic acid ester end groups is hardly of any consequence. Therefore, in accordance with the present invention, it is possible to use either an excess of the carbonates or an excess of the hydroxy compounds but in accordance with a preferred embodiment of the invention, an excess of the carbonates is used which was not heretofore possible and in this event the polycarbonate has improved aging resistance as can be seen from the comparison set out in Table 1 below:

TABLE 1

| Example | Diphenyl carbonate excess, mol percent | Catalyst [1] | Post condensation time, minutes | Relative viscosity [2] | Color number [3] | Percent phenolic OH-groups [4] | Discoloration after 21 days at 140° C. |
| --- | --- | --- | --- | --- | --- | --- | --- |
| 1a | 2 | 1.3 p.p.m. Na-bisphenolate. | 250 | 1.303 | 3 | 0.16 | Red-brown. |
| 4a | 6 | ----do---- | 325 | 1.296 | 3 | 0.08 | Pale brown. |
| 4b | 6 | 2.3 p.p.m. K-DPP | 145 | 1.301 | 1 | 0.02 | Not discolored. |
| 5 | 6 | 1.3 p.p.m. Na-bisphenolate +0.01% DPP. | 180 | 1.300 | 1–2 | 0.03 | Very slight discoloration. |
| 6 | 4 | 2.7 p.p.m. Na-di-(p-tert-butylphenyl)-phosphate. | 210 | 1.308 | 1–2 | 0.02 | Not discolored. |

[1] p.p.m.=parts per 10⁶ parts polycarbonate.
DPP=diphenyl phosphate.
K-DPP=potassium diphenyl phosphate.
[2] Measured in a 0.5% solution in methylene chloride at 20° C.
[3] 1=almost colourless.
2=pale yellow.
3=yellow.
[4] Determined from the intensity of the OH-oscillation bands in the infra-red spectrum.

Since the acidic phosphoric acid diaryl esters react with the basic catalysts which are generally present in the melt and result in the formation of corresponding diaryl acid salts, the salts may be used initially as the catalyst. It is also possible in accordance with the invention, and often desirable, to use the phosphoric acid diaryl esters or their salts together with the other heretofore known, more conventional transesterification catalysts.

The effect of shortening the time necessary for the transesterification reaction is especially effective toward the end of the transesterification reaction. Thus, at a time when it is desirable to have the reaction proceed as rapidly as possible thereby avoid putting a lot of heat into the reaction for a long time, this catalyst speeds up the reaction. It is therefore possible to subject the new polymer to a minimum of heat and still obtain high molecular weights when using the catalyst or mixture of catalysts according to the present invention. Table 2 given below clearly shows the advantage of using the catalyst of the present invention.

TABLE 2

| Example | Catalyst [1] | Post-condensation time, minutes | Relative viscosity [2] | Color number [3] |
| --- | --- | --- | --- | --- |
| 1a | 1.3 p.p.m. Na-bisphenolate. | 250 | 1.303 | 3 |
| 1b | 1.3 p.p.m. Na-bispheno+0.01% DPP. | 145 | 1.306 | 1–2 |
| 2 | 2.3 p.p.m. K-DPP | 120 | 1.301 | 1 |
| 3 | 0.65 p.p.m. Na-bisphenolate+1.5 p.p.m. K-DPP. | 130 | 1.305 | 1 |

[1] p.p.m.=parts per 10⁶ parts polycarbonate.
DPP=diphenyl phosphate.
K-DPP=potassium diphenyl phosphate.
[2] Measured in a 0.5% solution of methylene chloride at 20° C.
[3] 1=almost colorless.
2=pale yellow.
3=yellow.

In accordance with the present invention, approximately equivalent amounts or an excess of, for example, about 3 to about 10 percent by weight of a dialkyl, dicycloalkyl or diarylcarbonate is allowed to react with one or more aromatic dihydroxy compounds preferably in an inert gas atmosphere with the addition of a transesterification catalyst. In the simplest case, the disodium salt of the dihydroxy compound desired is mixed, preferably at a temperature of about 100 to about 250° C. with the carbonate preferably under reduced pressure and the monohydroxy compound resulting via the transesterification is removed from the reaction mixture. After about 80 to about 98 percent by weight preferably 90 to about 95 percent by weight of the theoretical amount of the monohydroxy compound has been distilled off, a diaryl ester of phosphoric acid such as diphenyl phosphate is added in amounts preferably of from about 0.001 percent to about 1 percent by weight and the reaction mixture is heated at about 280 to about 320° C. preferably under a high vacuum.

In accordance with another embodiment of the invention, a salt of a phosphoric acid diaryl ester such as potassium diphenyl phosphate is used as the transesterification catalyst preferably in amounts of about 0.0001 percent by weight to about 0.1 percent by weight by mixing the salt with the components in the first stage and the balance of the transesterification procedure is carried out in the conventional manner.

Still a further method involves using a known transesterification catalyst such as, cadmium acetate in combination with a salt of a phosphoric acid diaryl ester.

The known process for the production of high polymeric carbonic acid esters by the reaction of bis-(alkyl), bis-(cycloalkyl) or bis-(aryl) carbonates or aromatic dihydroxy compounds with themselves, while splitting off dialkyl, dicycloalkyl or diaryl carbonates, can also be accelerated in the same manner with the catalysts to be used according to the present invention. In the case of this embodiment of the process, the bis-carbonate of the aromatic dihydroxy compound is melted with the addition of a transesterification catalyst and of a diaryl phosphate, or with the addition of a salt of a diaryl phosphate, and possibly heated under reduced pressure until the resultant dialkyl or diaryl carbonate distills off. The temperature is subsequently increased to about 280 to about 320° C. and the polycondensation completed, expediently in a high vacuum.

If desired, any basic materials present in the melt can, as is known, be neutralized at the end of the reaction by the addition of base-binding materials. Furthermore, additives generally customary, such as stabilizing agents, dyestuffs, pigments, fillers and the like, can also be added, if desired.

Any suitable phosphoric acid diaryl ester may be used such as, for example, those having the formula

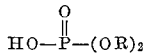

wherein R is an aryl radical such as phenyl, naphthyl, diphenyl or the like as well as alkyl substituted phenyl such as para-tolyl, para-tertiary butyl phenyl, cresyl or the like. Examples include phosphoric acid diaryl esters which can be used according to the present invention as accelerators, for example, diphenyl phosphate, di-para-tertiary-butyl-phenyl phosphate, dicresyl phosphate, di-para-nonyl-phenyl phosphate, phenyl-naphthyl phosphate and di-4-diphenyl phosphate.

Salts of diaryl phosphoric acid esters which can be used alone or in combination with known transesterification catalysts are, for example, the lithium, potassium, sodium, magnesium, calcium, zinc, manganese and tin salts of the above-mentioned diaryl phosphates. These could be represented by the formula

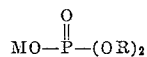

wherein R has the meaning above and M is the cation of the salt forming compounds set forth above, including the sodium salt of di-para-tertiary-butyl-phenyl phosphate and the like.

As carbonic acid esters, the usual compounds of this type can be used, especially for example, diphenyl carbonate, dicresyl carbonate, the bis-phenyl carbonates of hydroquinone, of resorcinol and of 4,4'-dihydroxy-diphenyl, the bis-phenyl carbonates of bis-(4-hydroxy phenyl)-alkanes, cycloalkanes, ethers, sulphides, sulphones and the like.

As aromatic dihydroxy compounds which can be used for the synthesis of high molecular weight polycarbonates, there may be used, for example, hydroquinone, resorcinol, 4,4'-dihydroxy-diphenyl, bis-(4-hydroxy-phenyl) alkanes, cycloalkanes, sulphides, ethers, sulphones and sulphoxides, a,a,a',a'-tetramethyl-a,a'-bis-(4-hydroxyphenyl)-para-xylene, tetrachloro-bisphenol and the like.

For the production of mixed polycarbonates, there can simultaneously also be used other dihydroxy compounds such as butane-1,4-diol, hexane-1,6-diol, para-xylene glycol, bis-hydroxyalkylated bis-phenyl-alkanes, bis-cyclohexyl-alkanes and the like.

The following examples are illustrative of the invention, parts being by weight unless otherwise specified.

Example 1

(a) About 7000 parts Bisphenol A, about 6700 parts diphenyl carbonate and about 0.01 part disodium bisphenolate are melted at about 140-160° C. under nitrogen in an autoclave of stainless steel of about 25 liters capacity provided with a stirrer and a distillation device. At a pressure of about 100 mm. Hg, the phenol formed is distilled off at a temperature of about 180-230° C., with stirring, within a period of about 165 minutes. At this moment, the distillate consists of about 5690 parts phenol, which contain about 0.06% diphenyl carbonate. For the removal of the residual amounts of phenol and for achieving the desired viscosity, the pressure is reduced to about 0.5 mm. Hg and the reaction completed at about 290-300° C. After about a further 250 minutes, there is thus obtained a clear yellow melt of polycarbonate which can be extruded as bristle, under nitrogen pressure, from the bottom valve of the autoclave. It has a relative viscosity of about 1.303, measured in about a 0.5% solution in methylene chloride at about 20° C.

(b) The production of the polycarbonate melt takes place in the same apparatus, under the same reaction conditions and with the same materials as under (a), with the difference that, before increasing the temperature to about 290-300° C., about 0.78 part diphenyl phosphate are introduced into the autoclave. The desired viscosity of the melt is subsequently achieved at about 290-300° C. and a pressure of about 0.5 mm. Hg after only about 145 minutes and the color of the melt is significantly lighter than in the case of (a). The polycarbonate obtained has a relative visosity of about 1.306, measured in about 0.5% solution in methylene chloride at about 20° C.

Example 2

About 7000 parts Bisphenol A, about 6700 parts diphenyl carbonate and about 0.018 part potassium diphenyl phosphate are melted under nitrogen and polycondensed in the manner described in Example 1(a). After distilling off the bulk of the phenol at about 180-230° C., the pressure is reduced to about 0.5 mm. Hg and the temperature increased to about 290-300° C. After stirring for about a further 120 minutes, the desired viscosity is already reached. The polycarbonate is almost colorless and has a relative viscosity of about 1.301.

Example 3

The process is carried out in the same way and with the same materials as stated in Example 2, but with the difference that, instead of about 0.018 part, only about 0.012 potassium diphenyl phosphate are used and, in addition, about 0.005 part disodium bisphenolate. The high vacuum step of the condensation is, in this case, terminated after about 130 minutes. An almost colorless polycarbonate with a relative viscosity of about 1.305 is obtained.

Example 4

(a) About 7000 parts bisphenol A, about 6950 parts diphenyl carbonate and about 0.1 part disodium bisphenolate are polycondensed as described in Example 1 (a). After distilling off the bulk of the phenol at about 180-230° C., the melt is heated to about 290-300° C., and the pressure reduced to about 0.5 mm. Hg. The desired viscosity is reached after stirring for about 325 minutes in a high vacuum. The polycarbonate has a yellowish color and possesses a relative viscosity of about 1.296. A test specimen produced therefrom shows a pale brown discoloration after storing for about 21 days at about 140° C.

(b) The process is carried out with the same amounts and under the same conditions as under (a) but, instead of about 0.01 part disodium bisphenolate, there are now used about 0.018 part potassium diphenyl phosphate. The desired viscosity of the melt is reached after stirring for only about 145 minutes in a high vacuum at about 290-300° C. The polycarbonate obtained is almost colorless and has a relative viscosity of about 1.301. A test specimen produced therefrom does not become discolored after storing for about 21 days at about 140° C.

Example 5

About 7000 parts Bisphenol A, about 6950 parts diphenyl carbonate and about 0.01 part disodium bisphenolate are melted in the apparatus described in Example 1 (a) under nitrogen as there indicated and precondensed at a gradually increasing internal temperature of about 180-250° C. and a pressure of about 100 mm. Hg.

After about 205 minutes, about 5700 parts phenol distill off which contain about 0.1 percent diphenyl carbonate.

About 0.78 part diphenyl phosphate are now added to the content of the autoclave. The temperature is increased to about 295-305° C. and the pressure reduced to about 0.5 mm. Hg. After stirring for about a further 180 minutes, the melt has reached the desired viscosity. The polycarbonate so obtained has a slightly pale yellow color and has a relative viscosity of about 1.300, measured with about 0.5% solution in methylene chloride at about 20° C. A test specimen produced therefrom is only slightly yellowish discolored after storage for about 21 days at about 140° C.

Example 6

About 7000 parts Bisphenol A, about 6940 parts diphenyl carbonate and about 0.021 parts sodium di-(para-tertiary-butyl-phenyl) phosphate are precondensed in the manner described in Example 1 (a) at a temperature of about 200-235° C. and a pressure of about 100 mm. Hg. After about 145 minutes, about 5760 parts phenol distill off which contain about 0.8 percent diphenyl carbonate. The content of the autoclave is then heated to about 295-305° C. and stirred for about 210 minutes at a pressure of about 0.5 mm. Hg. After this time, the melt has reached the desired viscosity. The polycarbonate obtained has a slightly pale yellow color and a relative viscosity of about 1.308. A test specimen produced therefrom shows no further discoloration after storage for about 21 days at about 140° C.

Example 7

About 6650 parts Bisphenol A, about 415 parts by weight 1,1-(4,4'-dihydroxy-diphenyl)-cyclohexane, about 6700 parts diphenyl carbonate, about 0.005 part disodium bisphenolate and about 0.018 part potassium diphenyl phosphate are polycondensed in the manner described in the preceding examples. After distilling off about 5690 parts phenol at about 100 mm. Hg and about 185–230° C. internal temperature, the reaction mixture is heated to about 290–300° C. and stirred for about 160 minutes at about 0.5 mm. Hg. A pale yellowish polycarbonate melt is obtained which has a relative viscosity of about 1.298.

Example 8

(a) About 23.4 parts bis-phenyl carbonic acid ester of Bisphenol A (bisphenol bisphenyl carbonate) and about 0.0001 part disodium bisphenolate are melted under nitrogen in a glass flask, provided with a distillation device and a stirrer, in the oil bath. Stirring is subsequently carried out for about 2 hours at a bath temperature of about 250 to 280° C. and a pressure of about 15 mm. Hg, whereby about 6 parts diphenyl carbonate distil off. The pressure is subsequently reduced to about 0.1 mm. Hg and the temperature increased to about 300° C. After stirring for about 180 minutes, a pale yellow polycarbonate melt is obtained which has a relative viscosity of about 1.292.

(b) About 23.4 parts of the bis-phenyl carbonic acid ester of Bisphenol A and about 0.0002 part potassium diphenyl phosphate and applying a high vacuum (about 0.1 mm. Hg), the desired viscosity is reached at about 300° C. after stirring for only about 100 minutes. The polycarbonate possesses a relative viscosity of about 1.310 and is almost colorless.

It is to be understood that the foregoing working examples are given for the purpose of illustration and that any other suitable phosphoric acid diaryl ester, carbonate, hydroxy compound or the like could have been used here provided the teachings of this disclosure are followed. In the foregoing working examples when the present Bisphenol A is used is it understood that the compound is 2,2-bis-(4-hydroxy-phenyl) propane.

Although the invention has been described in considerable detail in the foregoing, it is to be understood that such detail is solely for the purpose of illustration and that many variations can be made by those skilled in the art without departing from the spirit and scope of the invention except as set forth in the claims.

The polycarbonates of this invention are useful where polycarbonates have been used heretofore, for example, for the preparation of football helmets, aircraft dials, bottles and the like.

What is claimed is:

1. A method of catalyzing the reaction of a dihydric phenol with a diaryl carbonate which comprises carrying out the transesterification in the presence of a phosphoric acid diaryl ester or salt thereof.

2. The method of catalyzing the transesterification of a diarylcarbonate with a dihydroxy aromatic compound to produce a polyarylcarbonate which comprises heating said diarylcarbonate with said diaromatic compound in the presence of a phosphoric acid diaryl ester.

3. The method of preparing a polyarylcarbonate in stages which comprises reacting a diarylcarbonate with a dihydroxy aromatic compound in a first step at a temperature of from about 100 to about 250° C. until from about 80 to 98 percent by weight of the monohydroxy compound formed by said reaction has been produced and simultaneously removed from the reaction mixture and then heating the product of said first step to a temperature of from about 280 to about 320° C. in the presence of from about 0.001 percent to 1 percent by weight of a phosphoric acid diaryl ester or salt thereof.

4. The method of claim 3 wherein said phosphoric acid diaryl ester is diphenyl phosphate.

5. The method of claim 3 wherein said phosphoric acid diaryl ester is a salt.

6. The method of preparing a polyarylcarbonate which comprises reacting a diphenylcarbonate with a dihydroxy aromatic compound in the presence of a phosphoric acid diaryl ester.

7. The method of claim 6 wherein said dihydroxy aromatic compound is 2,2-bis-(4-hydroxy-phenyl) propane.

8. The method of claim 6 wherein said phosphoric acid diaryl ester is diphenyl phosphate.

9. The method of catalyzing the transesterification of a diaryl carbonate with a dihydroxy aromatic compound to produce a polyarylcarbonate which comprises mixing said carbonates with a phosphoric acid diaryl ester having the formula

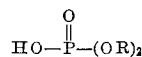

wherein R is an aryl radical containing one to two benzene ring systems.

References Cited by the Examiner
UNITED STATES PATENTS

| | | | |
|---|---|---|---|
| 2,437,046 | 3/1948 | Rothrock et al. | 260—75 |
| 2,964,797 | 12/1960 | Peilstöcker et al. | 260—47 |
| 3,148,985 | 9/1964 | Ossenbrunner et al. | 260—47 |

SAMUEL H. BLECH, *Primary Examiner.*